No. 753,586. PATENTED MAR. 1, 1904.
N. H. KODAMA.
AUTOMATIC ADDING AND SUBTRACTING APPARATUS.
APPLICATION FILED SEPT. 4, 1902. RENEWED JULY 13, 1903.
NO MODEL. 2 SHEETS—SHEET 1.

Witnesses:
Wilhelm Vogt
Thomas M. Smith

Inventor:
Nobyoshi N. Kodama
By J. Walter Douglas
Attorney

No. 753,586. PATENTED MAR. 1, 1904.
N. H. KODAMA.
AUTOMATIC ADDING AND SUBTRACTING APPARATUS.
APPLICATION FILED SEPT. 4, 1902. RENEWED JULY 13, 1903.
NO MODEL. 2 SHEETS—SHEET 2.
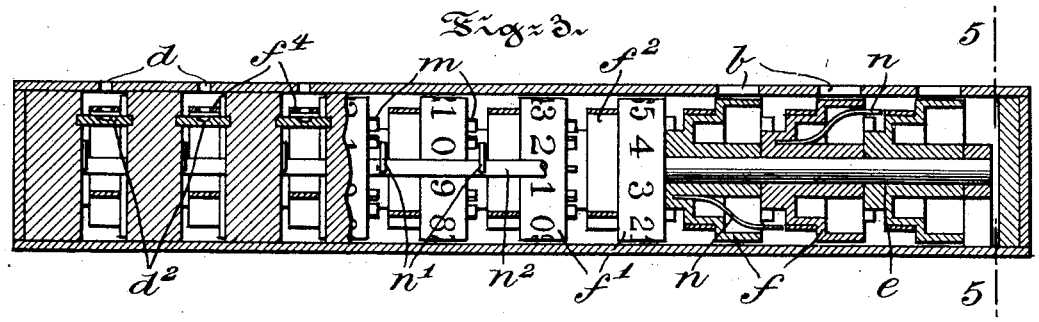
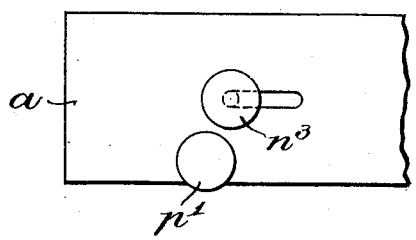
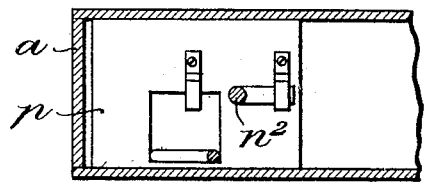
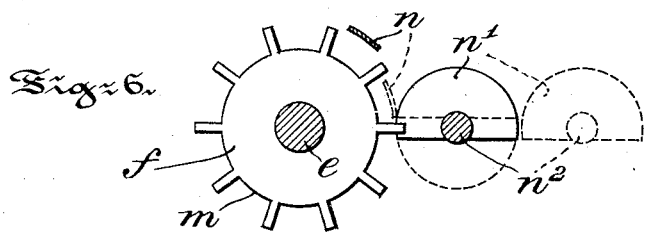
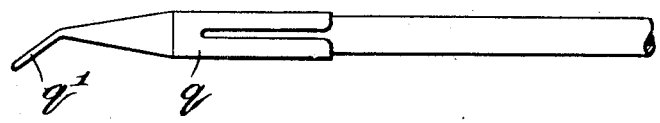
Witnesses:
Wilhelm Vogt
Thomas M. Smith
Inventor:
N. Hiyoshi H. Kodama
By J. Walter Douglass
Attorney
THE NORRIS PETERS CO., PHOTO-LITHO., WASHINGTON, D. C.

No. 753,586. Patented March 1, 1904.

UNITED STATES PATENT OFFICE.

NOBYOSHI H. KODAMA, OF NEW YORK, N. Y., ASSIGNOR OF ONE-HALF TO REBECCA GANCHER, OF NEW YORK, N. Y.

AUTOMATIC ADDING AND SUBTRACTING APPARATUS.

SPECIFICATION forming part of Letters Patent No. 753,586, dated March 1, 1904.

Application filed September 4, 1902. Renewed July 13, 1903. Serial No. 165,407. (No model.)

*To all whom it may concern:*

Be it known that I, NOBYOSHI H. KODAMA, a subject of the Emperor of Japan, residing at the city of New York, in the county of New York and State of New York, have invented certain new and useful Improvements in Automatic Adding and Subtracting Apparatus, of which the following is a specification.

My invention has relation to an apparatus for automatically adding and subtracting numbers, and in such connection it relates to the construction and arrangement of such an apparatus.

The nature and scope of my invention will be more fully understood from the following description, taken in connection with the accompanying drawings, forming part hereof, in which—

Figure 1:
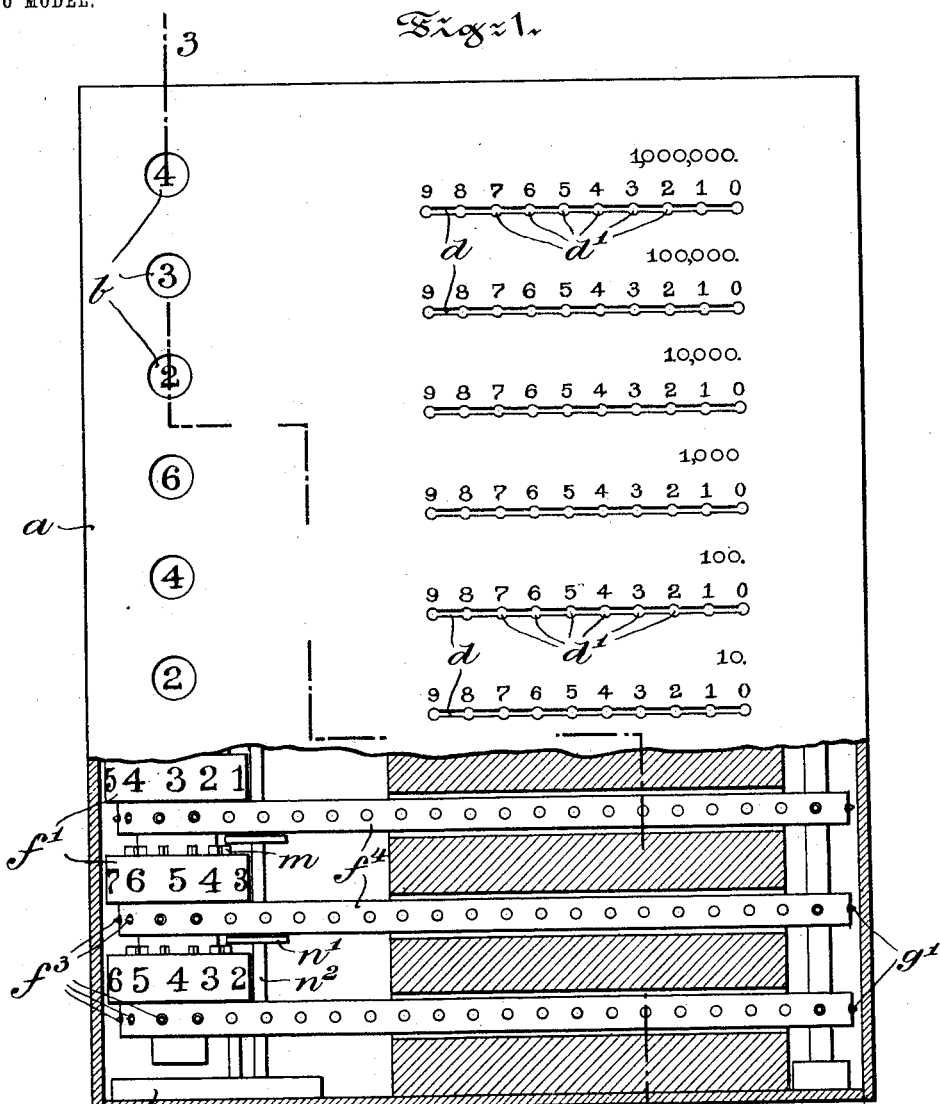
Figure 2:
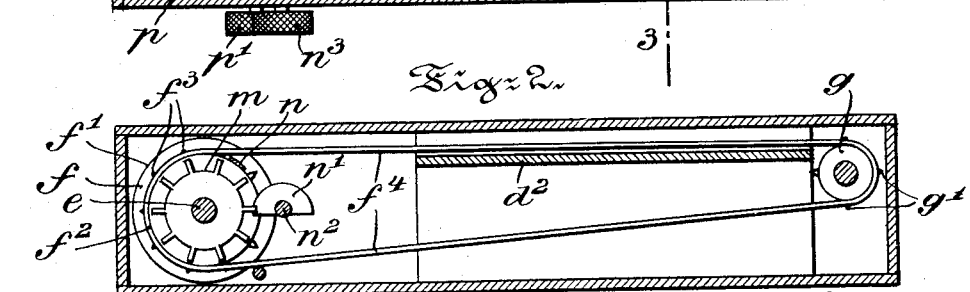

Figure 1 is a view, partly in plan and partly in horizontal section, of an apparatus embodying main features of my invention. Fig. 2 is a vertical sectional view of the same. Fig. 3 is a cross-sectional view taken on the line 3 3 of Fig. 1. Fig. 4 is a detail view illustrating in end elevation the means for changing the apparatus so that additions or subtractions may be made therein. Fig. 5 is a detail sectional view taken on the plane of the line 5 5 of Fig. 3. Fig. 6 is a detail view illustrating the operation of the device, and Fig. 7 is a side elevational view of the operating-pointer.

Referring to the drawings, $a$ represents the case of the apparatus, having on its upper face a series of openings $b$, arranged in alinement with each other along one edge—the left-hand edge of the apparatus. To the right of each opening $b$ is arranged a slit or slot $d$, connecting a series of openings $d'$, numbered, respectively, from left to right with the numerals descending from "9" to "0." Within the case $a$ and below the openings $b$ is arranged a shaft $e$, on which loosely turns a series of wheels $f$, having their main peripheries $f'$, carrying a series of numerals from "0" to "9" and registering with said openings $b$. Each wheel $f$ has a portion $f^2$ of less diameter than the main periphery $f'$ and preferably provided with a series of pins $f^3$, engaging an endless band or belt $f^4$. This band or belt $f^4$ passes around the pin portion $f^2$ of the wheel $f$ at one edge of the case $a$ and around a similar but smaller wheel $g$, having pins $g'$ at the opposite edge of the case $a$. Each belt $f^4$ in position rests approximately under a slot $d$ of the series of slots and is reinforced under said slotted portion of the case by a block $d^2$, as clearly shown in Fig. 2, the block $d^2$ supporting each belt $f^4$, so that it may slide between the block $d^2$ and the under face of the case below a slot $d$. In addition to the belt-pulley or sprocket portion $f^2$ of the wheel $f$ and the numbered peripheral portion $f'$ of said wheel there is also provided a toothed or ratcheted portion $m$, resting in position adjacent to and almost nested in the numbered portion $f'$ of a wheel $f$, preceding it in series, as clearly illustrated at the right-hand end of Fig. 3. Each wheel $f$ carries in its interior a flat spring $n$, projecting at its free end beyond the numeral periphery $f'$ and above a ratchet or toothed portion $m$ of the next succeeding wheel. The spring $n$ normally clears the ratchet periphery $m$ of the next succeeding wheel. Arranged normally in the path of each spring $n$ is a cam $n'$ the series of cams being fixed to a bar or shaft $n^2$, having an oscillating and a lateral or shifting movement in the case toward or away from the shaft $e$, which carries said wheels $f$. As a wheel $f$ turns upon its shaft $e$, so as to present the numeral "0" to the opening $b$, its spring $n$ will at that point in the revolution of the wheel $f$ strike upon the cam $n'$ and be deflected by said cam into engagement with a tooth of the ratchet portion $m$ of the next succeeding wheel $f$. A further movement of the first wheel $f$ while its spring is in engagement with the ratchet $m$ of the second wheel will serve to advance the second wheel one step in its revolution. A block $p$, adapted to be shifted from right to left or from left to right in the case $a$ (see Fig. 5) by a button $p'$, serves to shift the shaft $n^2$ and cams $n'$ toward or away from the shaft $e$ to thereby either bring the cams $n'$ into operative position or to release said cams from the springs $n$. A button $n^3$ on the end of the bar or shaft $n^2$ serves to oscillate said bar and cams $n'$, so that the cam-surfaces may either project above or below the shaft $n^2$, as required. A pointer $q$, having a pin $q'$ projecting at an angle to the main body of the pointer, (see Fig. 7,) is used to shift each belt $f^4$, as hereinafter described. When the cams $n'$ are shifted by the block $p$ away from the shaft $e$, as indicated in dotted lines in Fig. 6, then each wheel $f$, with its spring $n$, may be turned independently of any other wheel or spring and no interlocking of adjacent wheels takes place.

In operation the belts $f^4$ in series control, respectively, a numbered wheel $f$ in series used to designate from, say, one-hundredths of a unit upward to millions of units. If now we are required to add two numbers, the cams $n'$ are set as illustrated in full lines in Fig. 6 and all the belts $f^4$ are first turned separately until the numbered periphery of each wheel $f$ shows "zero," or "0," at each opening $b$. Supposing it is required, for instance, to add three hundred and ninety-five units (395) to one hundred and twenty-seven units, (127,) the hundreds-belt $f^4$ is shifted by the pointer $q$ until at the opening $b$ in the hundreds-row a numeral "3" shows. This is accomplished by putting the point $q'$ of the pointer $q$ into the slot $d$ at the point marked "3" and pushing the pointer and belt $f^4$ to the right until the pointer reaches "0," or zero. The numbered periphery of the wheel $f$ will then show a "3" at the opening $b$. In the same manner the belt $f^4$ of the tens is shifted by the pointer until the number-periphery $f'$ of its wheel $f$ discloses a "9" at the opening $b$ below the former or hundreds opening $b$. The units-belt $f^4$ is next shifted so that at the next succeeding or units opening $b$ the figure "5" shows. The apparatus on its face now indicates "3," "9," and "5," or three hundred and ninety-five. The one hundred in "one hundred and twenty-seven" is next added to the three hundreds now showing by putting the pointer in the hole "1" of the slot $d$ of the hundreds-line and shifting the belt $f^4$ of the hundreds to the right until the pointer rests in the hole "0." The number periphery $f'$ of the hundreds will now show "4" at the hundreds-opening $b$. The two tens are similarly added to the nine tens already showing; but in this instance as the tens-numbered periphery $f'$ turns from "9" to "0," its spring $n$ engages the ratchet $m$ of the hundreds-wheel $f$ and advances that wheel one point, making the hundreds five and the tens one. Again, the seven units are added to the five units by shifting the units-belt $f^4$ from "7" to "0" on the unit-slot $d$, and the spring $n$ of the units-wheel $f$ will at the proper time engage the ratchet $m$ of the tens-wheel $f$ to turn that wheel from "1" to "2," the units-wheel turning from "5," previously shown, beyond "0" to "2." The apparatus now indicates on its face five hundreds, two tens, and two units, or five hundred and twenty-two, the sum of the two numbers "395" and "127." When, however, subtraction of one number from another is to be performed, the number-peripheries of the wheels $f$ are first set to disclose at the proper openings $b$ the number representing the subtrahend. In subtracting, however, there must be a reverse movement of the bands or belts $f^4$ and of these number peripheries $f'$ from that given in addition. To permit of the proper transfer of motion from the units to the tens wheel or from the tens to hundreds wheel in the backward movement of the wheels, the cams $n'$ and their shaft $n^2$ must be turned a half-revolution, so that the cam-surfaces will be in position to operate the springs $n$ when such reverse movement of the wheels takes place. As already explained, this half-revolution of the shaft $n^2$ is preferably obtained by turning the button $n^3$ after the shaft $n^2$ and the cams $n$ have been moved away from the shaft $e$, so that the cams may clear the springs $n$ during the oscillation of the shaft $n^2$ by the manipulation of the block $p$ through its button $p'$. When so turned, the cams $n'$ and shaft $n^2$ are brought back to their original position near the shaft $e$ by a reverse movement of the block $p$. Having placed the apparatus in condition for the subtracting operations, the device is manipulated as follows: If from the number "725" is to be subtracted the number "539," the hundreds, tens, and units belts and wheels are first shifted to represent "725," as in addition. From the seven hundreds of "725" the five hundreds in "539" are first taken away by placing the point of the pointer $q$ in the "0" notch of the hundreds-slot $a$ and moving the belt $f^4$ from "0" to "5." The hundreds-wheel $f$ will move backward, showing at its opening successively "7," "6," "5," "4," "3," and "2," which latter number represents the result of subtracting five from seven. In the same manner from the two tens of "725" the three tens of "539" are subtracted by moving the belt and wheel of the tens backward, the pointer in the tens slot traveling from "0" to "3," thus turning the tens-wheel from "2" to successively "1," "0," and "9." When passing from "0" to "9," the spring $n$ of the tens-wheel strikes the ratchet of the hundreds-wheel and moves said wheel backward from "2" to "1," leaving one hundred and nine tens showing from the face of the case. The nine units of "539" are now subtracted from the five units of the "725" in the same manner, the units-wheel indicating "6" and the tens-wheel shifting backward from "9" to "8," thus leaving the figures "1," "8," and "6" showing from the openings $b$, which represent one hundred and eighty-six, the result obtained by subtracting "539" from "725." When a new operation is to be performed, the cams $n'$ and their shaft $n^2$ are shifted away from the shaft $e$ and wheels $f$ and the wheels $f$ all turned until "0" is shown at the respective openings. The cams $n'$ may then be brought in position for adding or subtracting operations, as required.

Having thus described the nature and object of my invention, what I claim as new, and desire to secure by Letters Patent, is—

1. In an apparatus of the character described, in combination with a series of wheels each carrying on its periphery a series of numerals, and means for turning each wheel independently of the others, of means for locking adjacent wheels in series together at one period of the movement of the first of said wheels in series, a series of cams each arranged to control said locking means, and mechanism for shifting said cams away from the locking means to prevent the locking of said adjacent wheels.

2. In an apparatus of the character described, in combination with a series of wheels each carrying on its periphery a series of numerals and means for turning each wheel in either direction independently of the others, means for locking adjacent wheels in series together at one period of the forward or reverse movement of the first of said wheels in series, a series of cams and means for oscillating said cams, said cams arranged in one position to control the locking means when the wheels turn in one direction and when arranged in an opposite position to control the locking means when the wheels turn in a reverse direction.

In testimony whereof I have hereunto set my signature in the presence of two subscribing witnesses.

NOBYOSHI H. KODAMA.

Witnesses:
JOHN N. BUCHHOLZ,
G. H. DALRYMPLE.